United States Patent [19]

McFarling et al.

[11] Patent Number: 5,758,142
[45] Date of Patent: May 26, 1998

[54] TRAINABLE APPARATUS FOR PREDICTING INSTRUCTION OUTCOMES IN PIPELINED PROCESSORS

[75] Inventors: Scott McFarling, Mt. View, Calif.; Simon C. Steely, Jr., Hudson, N.H.; Joel Emer, Acton; Edward McLellan, Holliston, both of Mass.

[73] Assignee: Digital Equipment Corporation, Maynard, Mass.

[21] Appl. No.: 251,078

[22] Filed: May 31, 1994

(Under 37 CFR 1.47)

[51] Int. Cl.$^6$ .................. G06F 9/22; G06F 9/38
[52] U.S. Cl. ............ 395/586; 395/580; 395/581; 395/587
[58] Field of Search ................ 395/375, 581, 395/582, 585, 586, 452, 464, 580–587; 358/429, 430

[56] References Cited

U.S. PATENT DOCUMENTS

| | | | |
|---|---|---|---|
| 4,559,563 | 12/1985 | Joiner, Jr. ........................... | 358/429 |
| 5,136,696 | 8/1992 | Beckwith et al. .................... | 395/587 |
| 5,179,673 | 1/1993 | Steely, Jr. et al. .................. | 395/586 |
| 5,276,882 | 1/1994 | Emma et al. ........................ | 395/587 |
| 5,353,421 | 10/1994 | Emma et al. ...................... | 395/587 |
| 5,394,529 | 2/1995 | Brown, III et al. ................. | 395/587 |
| 5,434,985 | 7/1995 | Emma et al. ...................... | 395/587 |
| 5,454,117 | 9/1995 | Puziol et al. ...................... | 395/800.23 |
| 5,504,867 | 4/1996 | Bosshart ........................... | 395/581 |
| 5,515,518 | 5/1996 | Stiles et al. ....................... | 395/586 |

OTHER PUBLICATIONS

Po–Yung Chang et al., "Alternative Implementation of Hybrid Branch Predictors", IEEE, 1995, pp. 252–257.

*Primary Examiner*—Parshotam S. Lall
*Assistant Examiner*—Bharcet Barot
*Attorney, Agent, or Firm*—David A. Dagg; Arthur W. Fisher

[57] ABSTRACT

A predictor which chooses between two or more predictors is described. The predictor includes a first component predictor which operates according to a first algorithm to produce a prediction of an action and a second component predictor which operates according to a second algorithm to produce a prediction of said action. The predictor also includes means, coupled to each of said first and second predictors, for choosing between predictions provided from said predictors to provide a prediction of the action from the predictor. The predictor can be used to predict outcomes of branches, cache hits, prefetched instruction sequences, and so forth.

31 Claims, 7 Drawing Sheets

TRAINABLE APPARATUS FOR PREDICTING INSTRUCTION OUTCOMES IN PIPELINED PROCESSORS

BACKGROUND OF THE INVENTION

This invention relates generally to computer systems and more particularly to prediction techniques used to predict behavior of computer instructions in pipelined processors.

As it is known in the art, computer systems have become ubiquitous. In particular, one type of computer system widely employed includes a so called pipelined processor. In a pipelined processor, instructions are decomposed into assembly-like stages and the instruction is operated on at each of the stages for each clock cycle in the pipeline. Illustratively, a pipelined stage includes an instruction fetch stage in which instructions are fetched in one or several cycles from a cache memory, an instruction decode stage in which an instruction's op-code, (i.e., a portion of the instruction which determines the function of the instruction) is examined to ascertain the function of the instruction and, thus, the resources needed by the instruction, as well as instruction issue stage and so forth.

Illustrative resources needed by the instruction may include general purpose registers within the CPU, access to internal buses, as well as external buses, and functional units, such as I/O units and arithmetic logic units (ALU's), etc.

During the third stage i.e. the instruction issue stage resource availability is checked for each instruction and resources are reserved for particular instructions. The fourth stage of a typical pipelined processor is the execution stage in which instructions are executed in one or several execution stages writing results into the general purpose registers during their last execution stage.

In an ideal pipelined processor, time is measured in CPU clock periods. In theory, the clock period for P-stage pipeline would be 1/P th, the clock period for a non-pipeline equivalent since the non-pipeline equivalent would have P–1 less stages of execution for the instruction. Thus, with a pipelined approach, there is the potential for a P times improvement in throughput or performance over a conventional non-pipelined architecture.

There are several practical limitations on pipelined performance, however, which prevents a pipelined processor from achieving the P times throughput improvement. One particular limitation on practical performance is instruction dependencies. Instruction dependencies may be viewed as those instructions which depend upon the result of previous instructions and may, therefore, have to wait for the previous instructions to complete execution before they can proceed through the pipeline.

Instruction dependencies can be of two types; data, so-called data dependency, and so-called control dependency. A control dependency occurs when a control decision, such as for example, a conditional branch decision must be made before subsequent instructions can be executed.

One technique, known in the art, to overcome the occurrence of instruction dependencies is so-called instruction scheduling. An important characteristic of a pipelined processor is that, by using equivalent but reordered code sequences, the pipelined processor can provide an improved performance by limiting so-called instruction dependencies.

However, when a processor has a branch type of instruction, the processor generally waits. For an unconditional branch, such as a go-to type of instruction the processor waits until a target address is calculated. For a conditional branch, such as an IF type statement, the processor waits until some branch prediction is resolved.

To improve performance of instruction scheduling in pipelined processors, branch prediction techniques have been developed to permit the processor to prefetch the proper address for the next instruction based upon a prediction as to which branch or path the instruction sequence will take upon execution of the branch instruction.

Branch prediction can be so-called static branch prediction or dynamic branch prediction. In static branch prediction, each branch encountered is assumed to be either "taken" or "not taken". Generally, the "not taken" branches are usually assumed and prediction is correct more often than not. However, when there is a branch mispredict, the instruction pipelined processor has to be flushed of the instructions currently under execution. Thus, the execution of the instructions is terminated and the instruction pipeline must be reloaded with a new set of instructions corresponding to the correct branch address. Branch mispredicts, therefore, waste valuable processor time particularly for very long pipelined processors.

So-called dynamic branch prediction techniques include local branch prediction apparatus in which the recent behavior history of a particular branch instruction identified by its address or value in a program counter is used to develop a prediction for the next occurrence of the instruction. Other types of dynamic branch prediction include so-called global branch prediction techniques in which a global branch predictor does not use the history of the branch being predicted but instead it attempts to find patterns in the recent behavior history of other branches which led to the pending execution of the branch instruction currently being predicted.

Both types of schemes provide improved performance over the static branch prediction technique. However, for optimal performance from processors which are expected to provide ever-increasing throughput and performance, additional improvement in prediction accuracy is needed.

Other dependencies such as data dependencies are encountered in pipelined processors. These data dependencies also require the processor to wait or flush the pipeline. One type of data dependency which occurs is a cache dependency, more commonly referred to as a cache miss.

One feature of modern processors is the use of very, high speed cache memory on or close to a semiconductor chip which embodies the central processing unit of the processor. So-called static random access memory, is used to provide a small but very fast and accessible cache for storage of data which the processor is currently or is expected to presently use. Generally, the period of time or latency from which an instruction requests data from a cache is substantially less than the time that it takes to retrieve the same data from main memory. That is, when a processor executes a load instruction, i.e., retrieves data from a cache or main memory to load a register in the processor, the processor issues an address and the address is examined by the cache. The cache generally examines a portion of the address bits against tags stored in a tag store associated with the cache to determine whether the requested data is resident in the cache. There are two basic types of caches, direct map caches and associative caches. With either type of cache, if the data requested by the processor is in the cache, a so-called cache hit is provided indicating that the cache can quickly supply the data to the processor. However, if the data is not in the cache, the data must be retrieved from either one or more lower level (and hence slower) caches or from main memory. Thus, with a caches miss generally, the processor stalls or delays processing instructions until additional time has elapsed for the data to be retrieved from the location containing the requested data until it can be provided to the processor.

The problem associated with caches in pipelined processors employing instruction schedulers is that in the event that an instruction scheduler schedules an instruction, for example a load instruction to issue from the cache, it would be desirable to know whether or not the data will be in the cache prior to the instruction actually being executed. Therefore, a prediction technique which can predict cache hits and cache misses would be desirable. In the event a prediction technique is provided, the instruction scheduler can use this information to hold off scheduling instructions that need the load result operand, while scheduling other instructions which are indepentant of the load operand.

SUMMARY OF THE INVENTION

In accordance with the present invention, a predictor, includes a first component predictor which operates according to a first algorithm to produce a prediction of an action and a second component predictor which operates according to a second algorithm to produce a prediction of said action. The predictor further includes means, coupled to each of said first and second predictors, for choosing between predictions provided from said predictors to provide a prediction of the action from the predictor. With such an arrangement, a better prediction mechanism is provided, since it combines two predictors with varying characteristics and can choose one of the predictors which performs best at each prediction. For example, the component predictors can each implement different local or global types of prediction algorithms or one could be a local algorithm while the other can be a global algorithm. Further, one or both of the predictors can be itself a choosing predictor.

BRIEF DESCRIPTION OF THE DRAWINGS

The above-mentioned and other features of the invention will now become more apparent by reference to the following description taken in connection with the accompanying drawings in which.

DESCRIPTION OF THE PREFERRED EMBODIMENT

Figure 1:
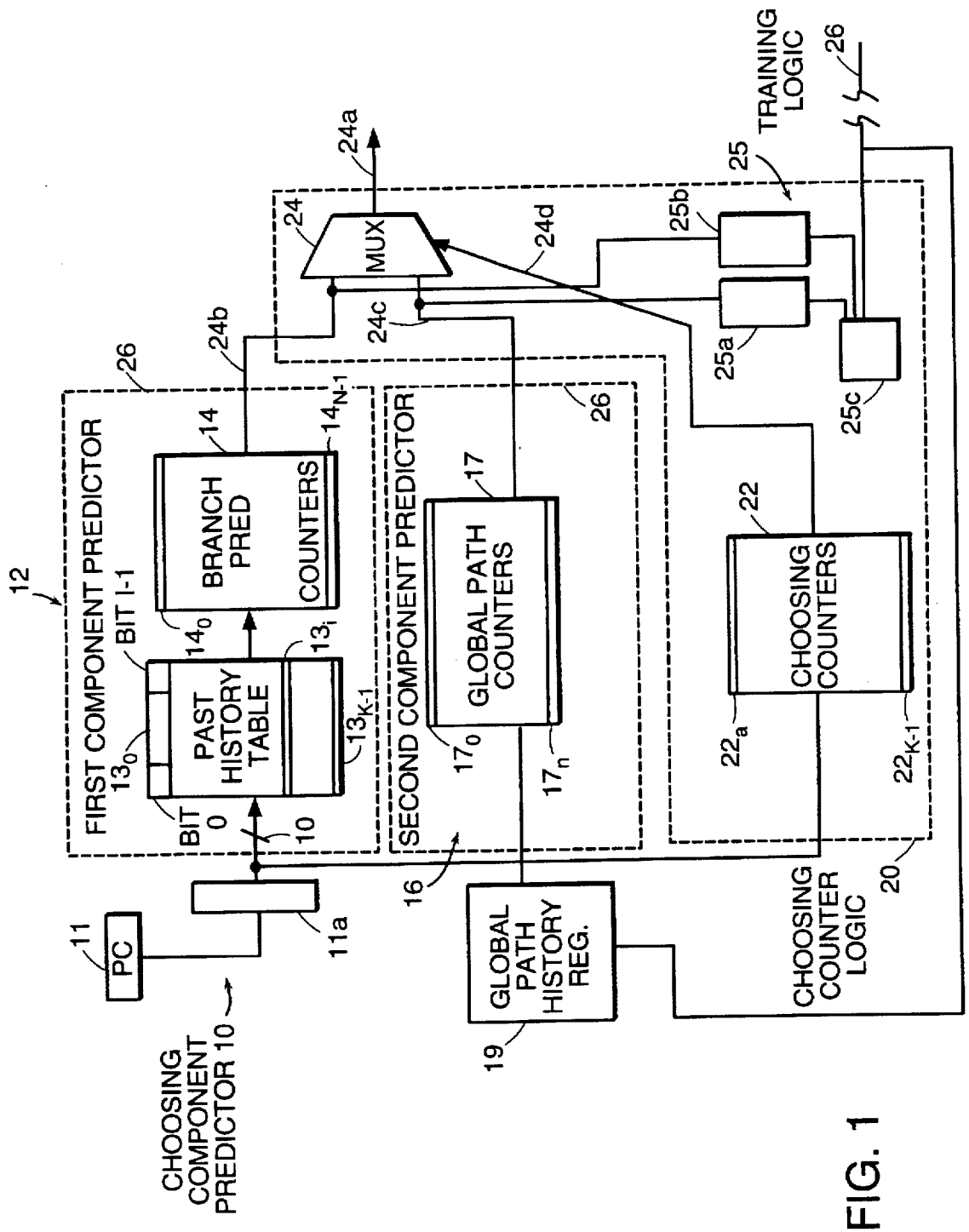
FIG. 1 is a block diagram of a choosing branch predictor in accordance with the present invention.

Referring now to FIG. 1, a choosing branch predictor 10 is shown to include a first branch predictor 12 which operates using a first algorithm or technique. In FIG. 1, the branch predictor 12 is a so-called local branch predictor and, in particular, is a branch predictor which operates using past history of branches of an instruction. The branch predictor 12 includes a branch past history table 13 comprised of a plurality of entries or registers $13_0$–$13_{k-1}$.

Accordingly, there are K number of registers in the table 13. Here, each of the registers are I bits wide, are right-shifting, shift registers with bit zero occupying the least significant bit (LSB) position and bit I−1 occupying the most significant bit (MSB) position. Register file 13 is fed at an input thereof via the address from the program counter 11. As an example, 10 bits of the program counter can be used to index table 13 and hence table 13 would be 1K entries long. The op-code portion (not shown) of the instruction at the instruction corresponding to the current value of the program counter 11 is partially decoded using a circuit specific to the processor (not shown) to ascertain whether or not the particular instruction is a branch-type of instruction. If the current instruction is a branch type of instruction, the register 11a is loaded with the address of the instruction from the program counter. This address presents an address to the register file 13 to select one of the registers in the register file 13, i.e., registers $13_0$ through $13_{k-1}$. At an output of the register file 13 the contents of the selected register are used as an index or address to a second file 14. Here "I" is assumed to be 13 and thus provides a 13-bit address to the file 14. Thus file 14 is 8K entries long. Here the second file 14 is a counter file comprised of a plurality of M-bit counters $14_0$–$14_{N-1}$ where M is equal to 3 and N is equal to $2^I$. The output of each of these counters is selectively provided in accordance with the address from the register file 13 and is fed to an input 24b of a multiplexer 24. Here, each of the counters $14_0$–$14_N$ are non-modular (i.e., non wrap-around) M-bit wide counters where M is equal to illustratively 3. The counters use their most significant bit as the output bit to provide to the input of multiplexer 24 along line 24b. In a convention used here, the MSB provided from counter 14 illustratively indicates that a branch should be taken when the MSB equals a logic "one" or should not be taken when the MSB equals a logic "zero".

Thus, past branch history table 13 is used to store the N previous resolved branch directions of that particular instruction. That is, the results of whether a branch was taken or not taken are recorded in the past branch history 13 table for each encountered branch instruction. On the other hand, the counter table 14 is a branch prediction table which is used to provide a certain granularity to the branch prediction. That is, since a non-modular counter is used as an addressable entry to each one of the entries in the table, the most recent occurrence of the instruction is given only partial weight in determining whether the instruction will branch or not branch the next time that location and hence that instruction is encountered. In particular, the counters $14_0$–$14_{n-1}$ are up/down counters non-modulo i.e. non wrap-around counters, (i.e., when the counter reaches a state 11111 or 00000, the counter is not incremented to the next module state rather the counter remains in the particular aforementioned state and will only be decremented to the next lower state or incremented to the next higher state, respectively.

Accordingly, this technique of branch prediction examines the history of the previous N number branches as provided from the past history table and the contents of the associated counter for a particular instruction in response to the address provided from the program counter to provide a prediction on the behavior of branch type of instructions.

This technique provides a higher accuracy than prior static techniques or a simple dynamic prediction technique since the technique uses two tables to determine branch history information and to make branch predictions. The past history table is used to determine what happened during the actual last N number of branches whereas, the branch prediction table 14 is used to ascertain a particular branch behavior of a particular pattern provided from the branch history table.

Recalling for the moment that the branch prediction history table 13 provides an address to a specific pattern associated with the particular instruction, for the particular pattern (from the appropriate register and table 13), a more trained predictior or guess can be provided by the appropriate counter in branch prediction table 14. Accordingly, for the same instruction, a different pattern may be provided based upon the recent past history of the instruction. This different pattern is used at a different address to the branch prediction table to obtain a different counter which will contain possibly a different count pattern to ascertain whether a branch should be predicted as taken or not taken. Alternative examples of a local branch history type of prediction circuit which can be substituted for the branch predictor 12, described above, can be found in U.S. patent application Ser. No. 07/975,248 filed on Nov. 12, 1992 entitled "Past History Filtered Branch Prediction" by Simon C. Steely, et al and assigned to the assignee of the present invention, now abandoned and which is incorporated herein by reference.

The choosing predictor 10 further includes a second prediction circuit 16 which uses a technique which is selected to be different from the technique or algorithm implemented in the first predictor 12. Here, this second predictor 16 uses a global branch prediction technique in which the branch histories of the most recent branches encountered prior to the current branch instruction are used to make a prediction concerning the current branch instruction. Accordingly, the global branch predictor 16 includes a global path history register 19, here 13 bits wide which stores the 13 most recent branch resolutions of the 13 most previously encountered branches prior to the current branch. This index stored in register 19 serves as an index to a counter file 17 (here also 8K long) which comprised of a plurality of counters $17_0$–$17_N$. Here, each of the counters are two bit counters, are non-modular, i.e., non wrap-around, and are up/down counters. The most significant bit of a selected one of the counters which is selected in accordance with the branch path history fed to the counter file provides an input along line 24c to multiplexer 24.

Thus, the choosing predictor 10 is comprised of two distinct predictors 12 and 16. Here, predictor 12 is chosen to operate optimally on relatively short branch patterns and, more particularly, is chosen to train relatively quickly (i.e., to be required to provide a relatively small number of operation sequences to build up a history to ascertain correct prediction sequences). Predictor 16, on the other hand, is less efficient at being trained (i.e.,requires longer instruction sequences to arrive at more correct branch predictions). However, as the predictor becomes trained, the degree of prediction and the accuracy of the prediction increases.

Therefore, the choosing predictor 10 includes a choosing circuit 20 comprised of the aforementioned multiplexer 24, as well as control logic 25, which is used to update or train a choosing table 22. In the embodiment shown in FIG. 1, the choosing table 22 is a choosing counter table and is addressed via the output of register 11a, here 13 bits of the program counter (PC) 11 for the particular decoded branch type of instruction, as previously mentioned. Alternatively, the choosing table 22 could be a register stack whose states are used to determine majority direction. In the present embodiment, the PC serves to access the counter table 22 here comprised of two bit counters $22_a$–$22_{k-1}$. These counters provide their MSB as the selection bit to determine whether the multiplexer 24 will provide at the output 24a thereof a branch prediction from the predictor 12 or the predictor 16. The counter 22 is updated via training logic 25 which has as inputs, the prediction outputs of each component predictor 12, 16, as well as the branch resolution signal 26 provided from a branch resolution circuit not shown but which can be the type as described in the above mentioned co-pending application.

The training logic 25 produces an increment signal to the appropriate counter if the predictor 12 provided a correct prediction and the predictor 16 provided an incorrect prediction, and provides a decrement signal to the counter if the predictor 16 provided a correct prediction and the predictor 12 provided an incorrect prediction. If both predictors provided incorrect predictions or correct predictions, the state of a counter is not changed. Thus, the logic 25 is comprised of a pair of tables 25a, 25b to store the predictions made from the component predictors 12, 16, and logic 25c to gate the resolution for a particular prediction stored in the table with the resolution of that particular instruction. The tables 25a and 25b are accessed via a logical instruction number as described in conjunction with the co-pending application. Alternatively, a siloing scheme can be used to keep track of the predictions from the component predictors. Each component predictor would have similar training logic for the particular component predictor.

Over a period of time, the training mechanism provides values for the entries in the counter Table 22 which will select the appropriate one of the predictors 12 and 16 to provide optimal performance for a processor incorporating a choosing predictor 10.

Figure 2:
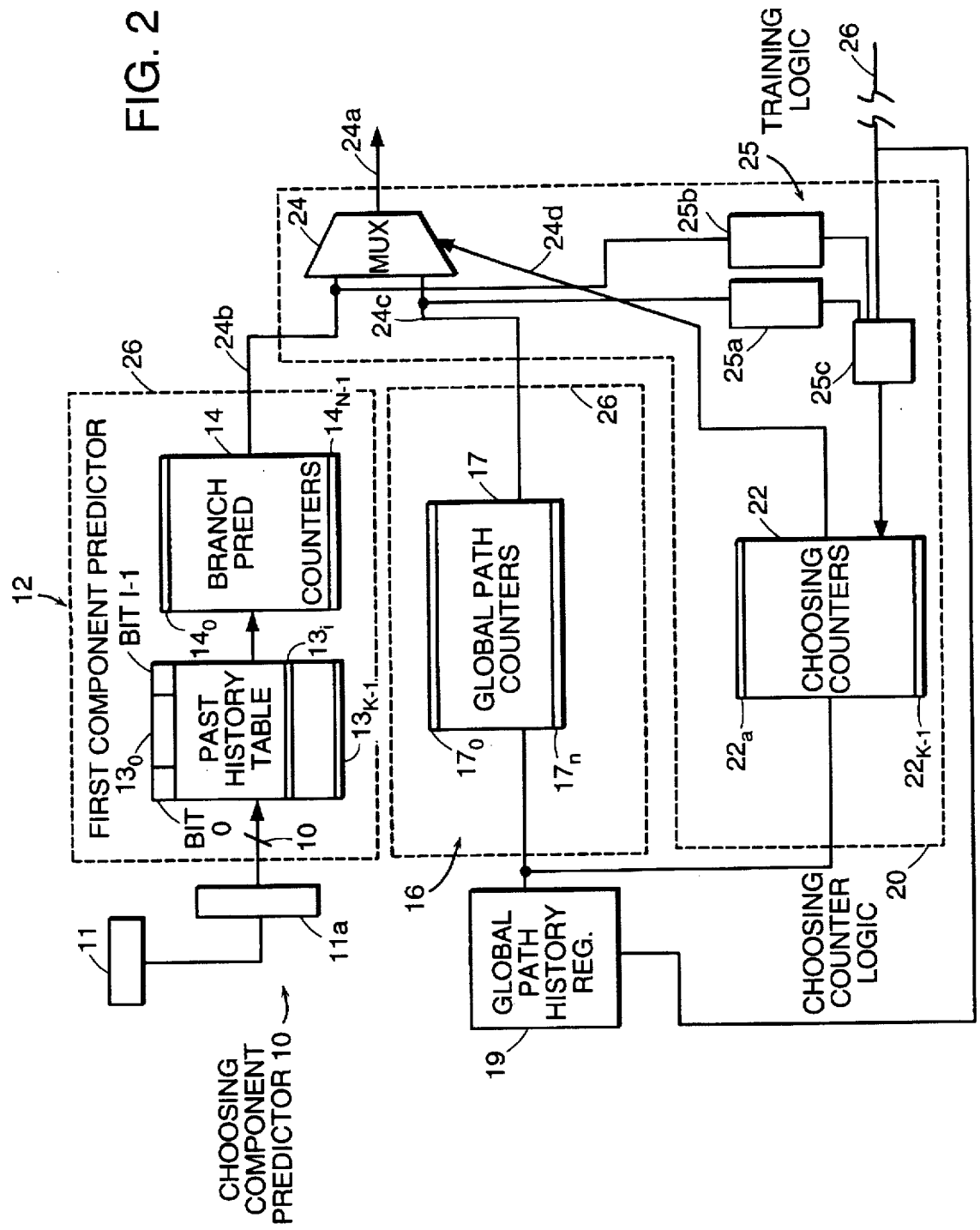
FIG. 2 is a block diagram of an alternate embodiment of a choosing branch predictor in accordance with a further aspect of the present invention.

Referring now to FIG. 2, a choosing predictor 10' which is similar to the choosing predictor 10 described in conjunction with FIG. 1 is shown to include the first component predictor 12, second component predictor 16 and choosing circuit 20 as generally described in conjunction with FIG. 1. Here, however, rather than the choosing counter table 22 being indexed from the value of the program counter via register 11a, the choosing counter table 22 is indexed via the output of the global history register 19.

By using the global path history rather than the PC address as the index to the choosing counter table 22, for those branches whose behavior is highly correlated with the particular path used to reach the current branch instruction, choosing the predictor based upon the path will provide better performance. For those branches which are not highly correlated with the particular branch, those branches will in general quickly learn to choose the other predictor. As an alternative, the global path history can be "exclusive or'ed" not shown (or other hashing function) with selected bits of the program counter 11 to provide the index to the choosing counter table 22.

Figure 3:
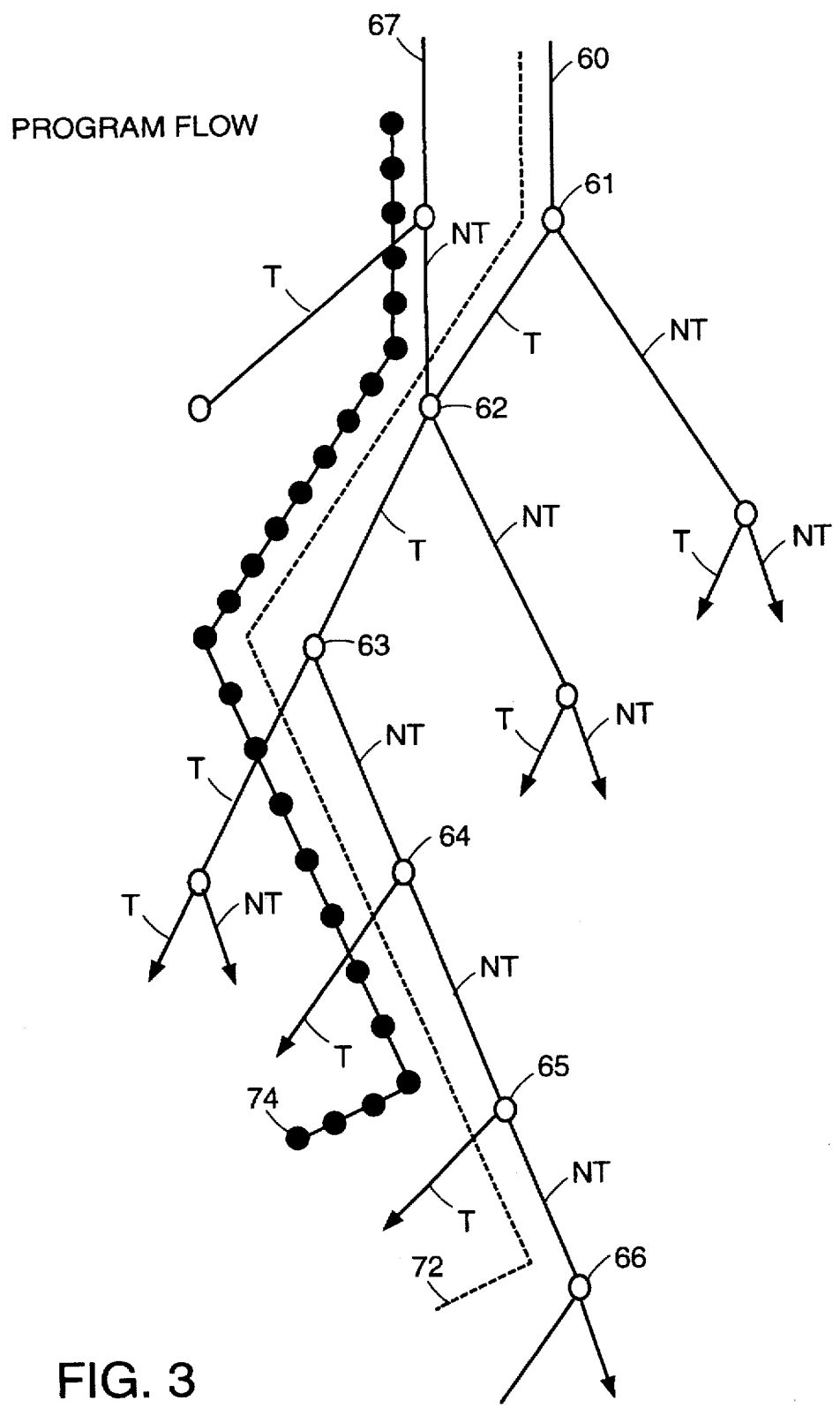
FIG. 3 is a program flow diagram showing a typical sequence of branch instructions to illustrate operation of the branch predictors of either FIG. 1 or FIG. 2.

Referring now to FIG. 3, a program flow diagram which illustrates how data is collected in the global history register 19 is shown. In FIG. 3, circles indicate instructions of a conditional branch type, whereas, lines indicate one of two paths or sequences of instructions which can be executed depending upon the outcome of the conditional branch. The lines which emanate from the circles towards the left of the page are "taken" branches denoted as "T", whereas, the lines which emanate from the circles towards the right side of the page are "not taken" branches and are denoted by "NT".

Thus, for a program flow provided from the instruction sequence 60, the instruction sequence encounters a first conditional instruction type 61 which provides one of two paths, a taken path (T) and a not taken path (NT). The taken path (T) executes a second series of instructions to a second conditional branch 62 which, likewise, has a taken (T) and not taken (NT) potential paths. The instruction flow can follow a path denoted by the dash line 72 starting at instruction sequence 60 and, thus, would have a global path history of (00011) where zero corresponds to the "not taken" branch and one corresponds to a "taken" branch.

At instruction 66, however, a potential second sequence or pattern can be arrived at by noting that the dotted line 74 which starts along an instruction sequence 67 and, thus, would provide a global path history of (100010).

Thus, as shown in FIG. 3, two different branch patterns can be used to arrive at instruction 66. At the juncture of instruction 66, a global predictor would determine which of the two patterns 72, 74 was used to arrive at instruction 66, and would thus make a decision to determine the appropriate branch prediction in accordance with the pattern. Whereas, for a local branch predictor, such as 12, the last N occurrences of whether the branch was taken or not taken at instruction 66 would be used to determine whether the branch should or should not be taken at the current occurance of instruction 66. In the former, therefore, the history of the branches (i.e. branch paths) leading up to the current branch is used to determine the instruction, whereas, in the latter, the past history of the resolved branches at the value of the program counter is used to determine whether a prediction of a branch should or should not be taken is made.

Figure 4:
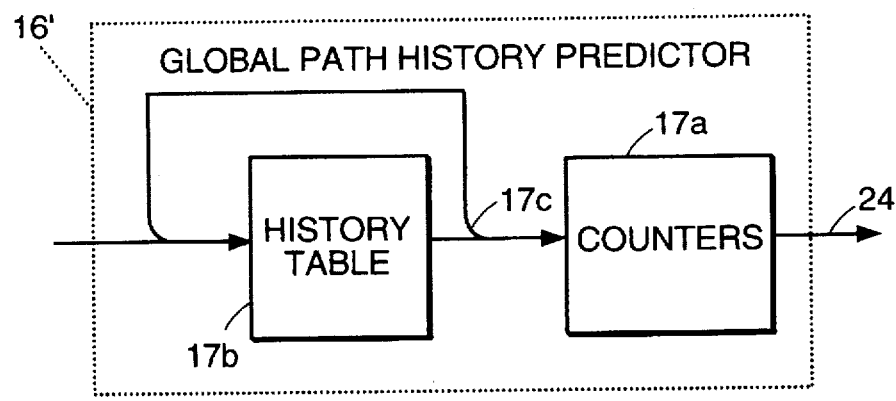
FIG. 4 is a block diagram of an alternate embodiment of a global branch predictor for use in the choosing predictors of FIGS. 1 and 2.

Referring now to FIG. 4, an alternate embodiment of a global prediction apparatus 16' is shown to include a global path history table 17b which is a single bit wide and comprised of plurality of entries corresponding to the number of entries which can be addressed in accordance with the number of bits in the global path history register 19 (FIG. 1). The contents of the past history table are the history as to whether the branch was taken or not taken at the corresponding global path history index. The single bit output of this register stack, as well as the twelve most recent past history branches, are concatenated together via bus 17c to provide an address to the two bit counter table 17a to provide the selected MSB of the counter as the output of counter table 17a. The MSB is fed to input 24c of multiplexer 24 (FIG. 1).

This dual stage global predictor scheme can work better than the single stage scheme 16, described in conjunction with FIGS. 1 and 2 since using history bits allows patterns of behavior to be recognized at a particular global history compared to just majority direction as is provided from just using counters.

Figure 5:
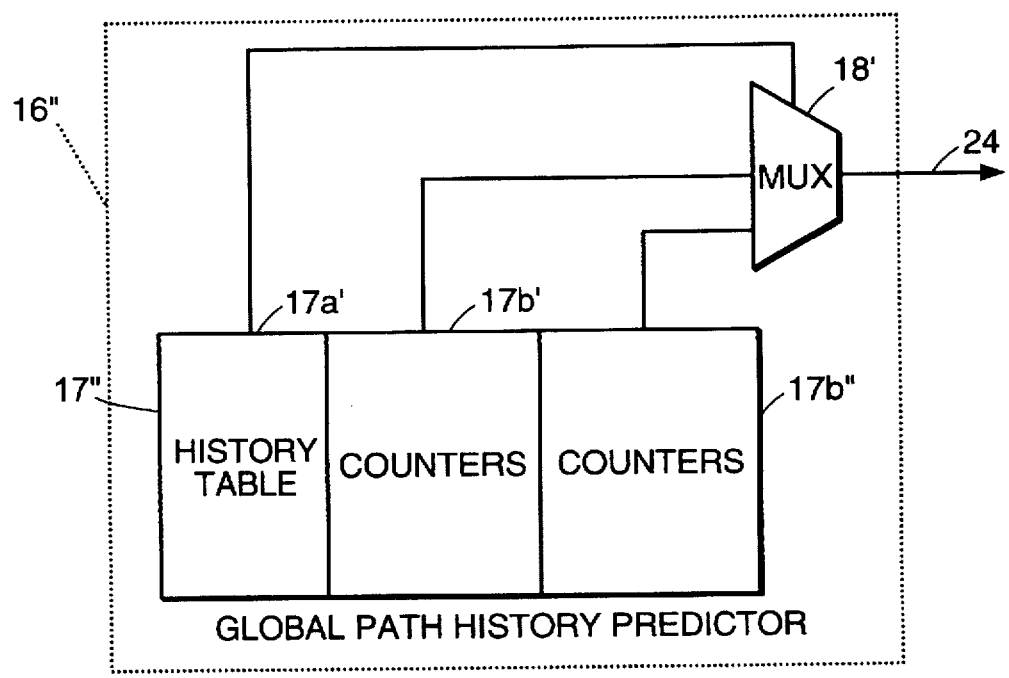
FIG. 5 is a block diagram of a further alternate embodiment of a global branch predictor for use in the choosing predictors of FIGS. 1 and 2.

Referring now to FIG. 5, a single stage implementation of the dual stage arrangement described in FIG. 4 is shown to include a single register file or a counter file 17' comprised of a single entry past history field 17a' and two 2 bit counter fields, 17b' and 17b". The single bit past history field 17a' provides an output which is used as a select to a multiplexer 18 which is fed via the outputs of counter field 17b' and 17b" to provide at the output thereof along line 24c a component prediction to the multiplexer 24 of the choosing predictor 10.

Figure 6:
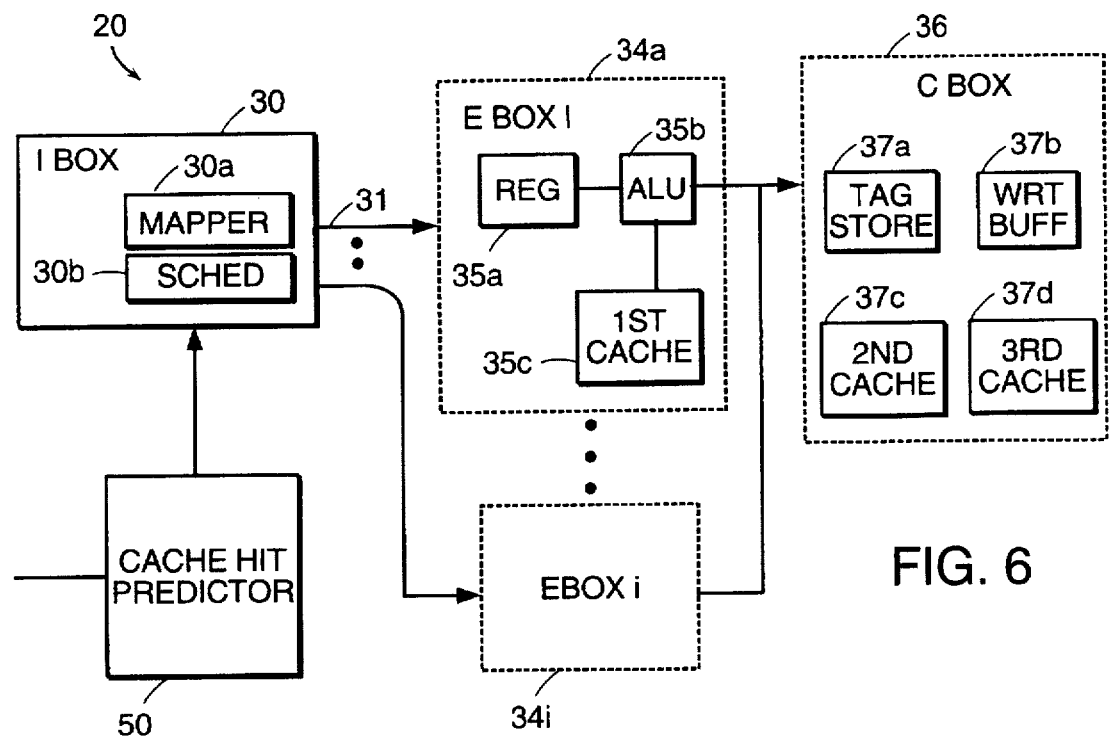
FIG. 6 is a block diagram of a pipelined processor employing a cache hit predictor in accordance with a still further aspect of the present invention.

Referring now to FIG. 6, a illustrative pipeline processor 20 is shown to include an IBOX 30 including an integer register mapper 30a and an integer instruction scheduler 30b. The instruction scheduler 30b is a multiple issue scheduler which can reorder the sequence of the issued instructions from the originally provided stream to optimize processor performance. Here IBOX 30 is a multiple issue instruction box of a type generally described in conjunction with the above-identified patent application although other types could alternatively be used. The instruction scheduler 30b in the IBOX 30 reorders issuance of instructions in accordance with the availability of resources in the processor, as well as latencies associated with each of the instructions.

The instructions are fed to a plurality of execution boxes (EBOX$_1$–EBOX$_j$) here 34a–34i, as shown via bus 31. Each of the execution boxes EBOX$_1$–EBOX$_j$ includes a general purpose register file 35a arithmetic logic unit 35b and first level cache 35c and is generally of the type also described in the above-identified patent application although other types can alternatively be used. The processor 20 further includes a cache box 36 including a tag store 37a, a write buffer 37b, as well as second and third level caches 37c and 37d, and is generally of a type also described in conjunction with the above-mentioned co-pending patent application.

Figure 7:
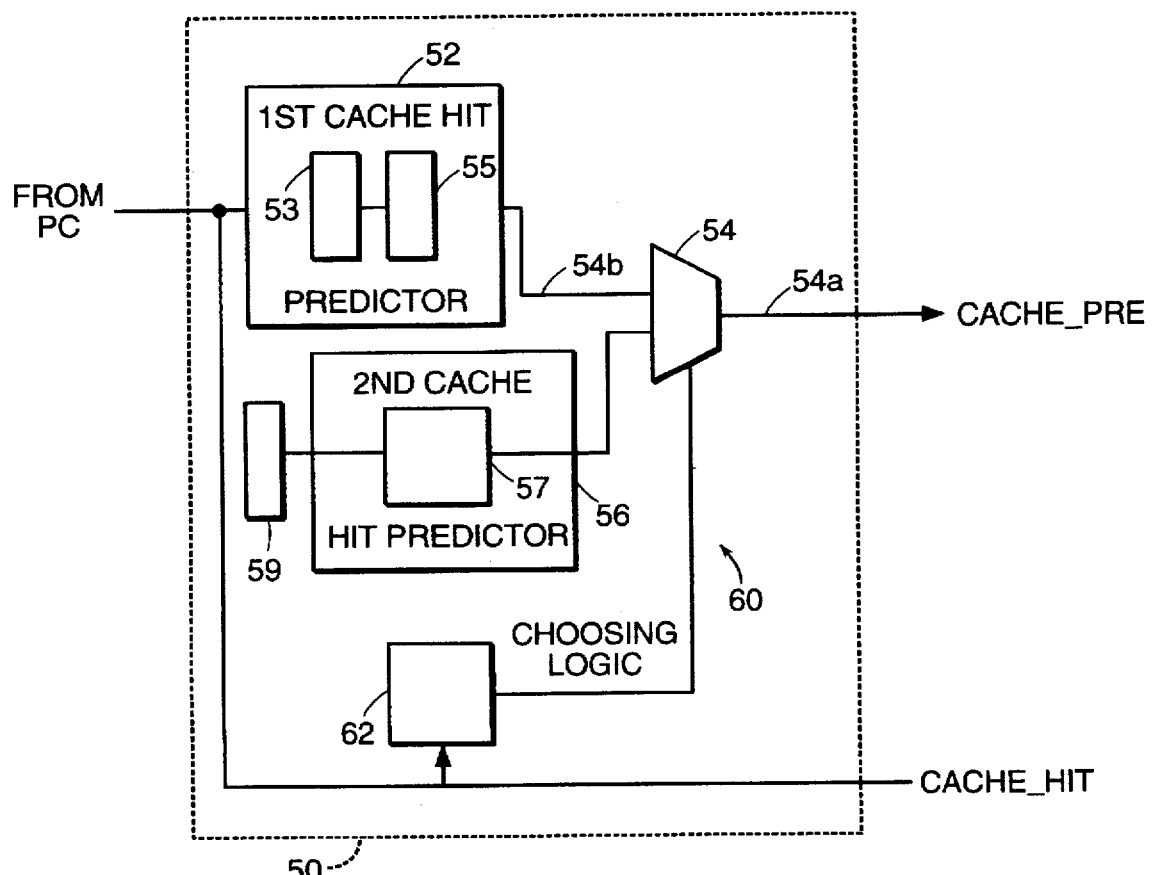
FIG. 7 is a block diagram of a cache hit predictor for use in the processor shown in FIG. 6.

The processor 20 further includes a cache hit prediction choosing predictor 50, as will be generally described in conjunction with FIG. 7. The cache hit predictor 50 is used to generate a prediction for load type of instructions as to whether data required by the load instruction is or will be available in the highest level cache 35c. The prediction signal is thus a hit prediction signal and is used by the instruction scheduler to schedule ahead of the instructions dependant upon the results of the load instruction additional instructions if the prediction signal indicates that a cache miss will occur.

In the event of a cache miss, the processor will retrieve data from lower level caches or main memory. While the latency for retrieval from the cache 35c may be 3 or 4 processor cycles, the latency from lower level caches can be 10 or more and from main memory can be several tens of cycles. Thus, by providing a prediction as to whether there will be a cache hit or miss, the scheduler can schedule additional instructions for cache miss predictions thereby provide useful work from the processor at a cache miss condition.

Referring now to FIG. 7, a choosing cache hit predictor 50 is shown to include a first component predictor 52, a second component predictor 56 and choosing circuit 54 as generally described for the branch predictor in conjunction with FIG. 1. The first cache hit predictor 52 operates using a first algorithm or technique and is a so-called local cache hit predictor which operates using past history of cache hits of a particular load instruction. The cache hit predictor 52 includes a cache hit past history table 53 comprised of a plurality of entries or registers appropriate for the particular implementation. Here, each of the registers are I bits wide, are right-shifting shift registers with bit zero occupying the least significant bit position and bit I−1 occupying the most significant bit position. Register file 53 is fed at an input thereof via the address from the program counter 11 (FIG. 1).

The op-code portion (not shown) of the instruction at the instruction corresponding to the current value of the program counter 11 (FIG. 1) is partially decoded using a circuit specific to the processor (not shown) to ascertain whether or not the particular instruction is a load-type of instruction. If the current instruction is a load type of instruction, the address of the instruction from the program counter is presented to the register file 53 to select one of the registers in the register file 53.

At an output of the register file 53, the contents of the selected register are used as an index or address to a second file 55. Here the second file 55 is a counter file comprised of a plurality of M-bit counters. The output of each of these counters are selectively provided in accordance with the address from the register file 53 and are fed to an input 54b of a multiplexer 54. Here, each of the counters are non-modular (i.e., non wrap-around) M-bit wide counters where M is equal to illustratively 3. The counters use their most significant bit as the output bit to the input of multiplexer 54 along line 54b. In a convention used here, the MSB provided from counter file 55 illustratively indicates that a cache hit should be predicted when the MSB equals a logic "one" or a cache miss should be predicted when the MSB equals a logic "zero".

Thus, past cache hit history table 13 is used to store the N previous cache hit/miss occurrences of that particular instruction. Whereas, the bank of non-modulo counters is used to predict whether the instruction will have a cache hit or miss. Accordingly, this technique of cache prediction examines the history of the previous N number hits/misses as provided from the past history table 53 and the contents of the associated counter 55 for a particular instruction in response to the address provided from the program counter to provide a prediction on the behavior of load-type of instructions.

The choosing predictor 50 further includes a second prediction circuit 56 which uses a technique which is selected to be different from the technique or algorithm implemented in the first cache hit predictor 52. Here, this second predictor 56 uses a global cache hit prediction technique in which the histories of the most recent load instructions encountered prior to the current load instruction are used to make a prediction concerning the current load instruction. Accordingly, the global cache hit predictor 56 includes a global path history register 59, here 13 bits wide which stores the 13 most recent hit/miss resolutions of the 13 most previously encountered loads prior to the current load. This index stored in register 59 serves as an index to a counter file 57 which comprised of a plurality of counters. Here, each of the counters are two bit counters, are non-modular, i.e., non wrap-around, and are up/down counters. The most significant bit of a selected one of the counters which is selected in accordance with the branch path history fed to the counter file provides an input along lines 54b and 54c multiplexer 54.

The choosing predictor 50 includes a choosing circuit 60 comprised of the aforementioned multiplexer 54, as well as control logic (not shown) which is used to update or train a choosing counter table 62. In the embodiment shown in FIG. 7, the choosing counter table 62 is addressed via the program counter 11. In other embodiments, the global hits history may be used. This index serves to access the counter table 62. The counters provide their MSB as the selection bit to determine whether the multiplexer 54 will provide at the output 54a thereof a cache hit prediction from the predictor 52 or the predictor 56.

The counter 62 is updated via the logic (not shown) which has as inputs the prediction outputs from the component predictors 52, 54, as well as, a cache hit signal 66 provided from a cache controller (not shown). The logic produces an increment signal to the appropriate counter if the predictor 52 provided a correct prediction and the predictor 56 provided an incorrect prediction, and provides a decrement signal to the counter if the predictor 56 provided a correct prediction and the predictor 52 provided an incorrect prediction. If both predictors provided incorrect predictions or correct predictions, the state of a counter is not changed. Over a period of time, the training mechanism provides values for the entries in the counter table 62 which will select the appropriate one of the predictors 52 and 56 to provide optimal performance for a processor incorporating the cache hit choosing predictor 50.

Other types of choosing predictors can thus be used. For example, a choosing predictor can be used to make a prediction of whether a particular instruction is free of data dependencies. Or a choosing predictor can be used to predict bus idle time so that buffered operations such as writes can be freely issued. Thus, a generalized choosing predictor can now be discussed.

Figure 8:
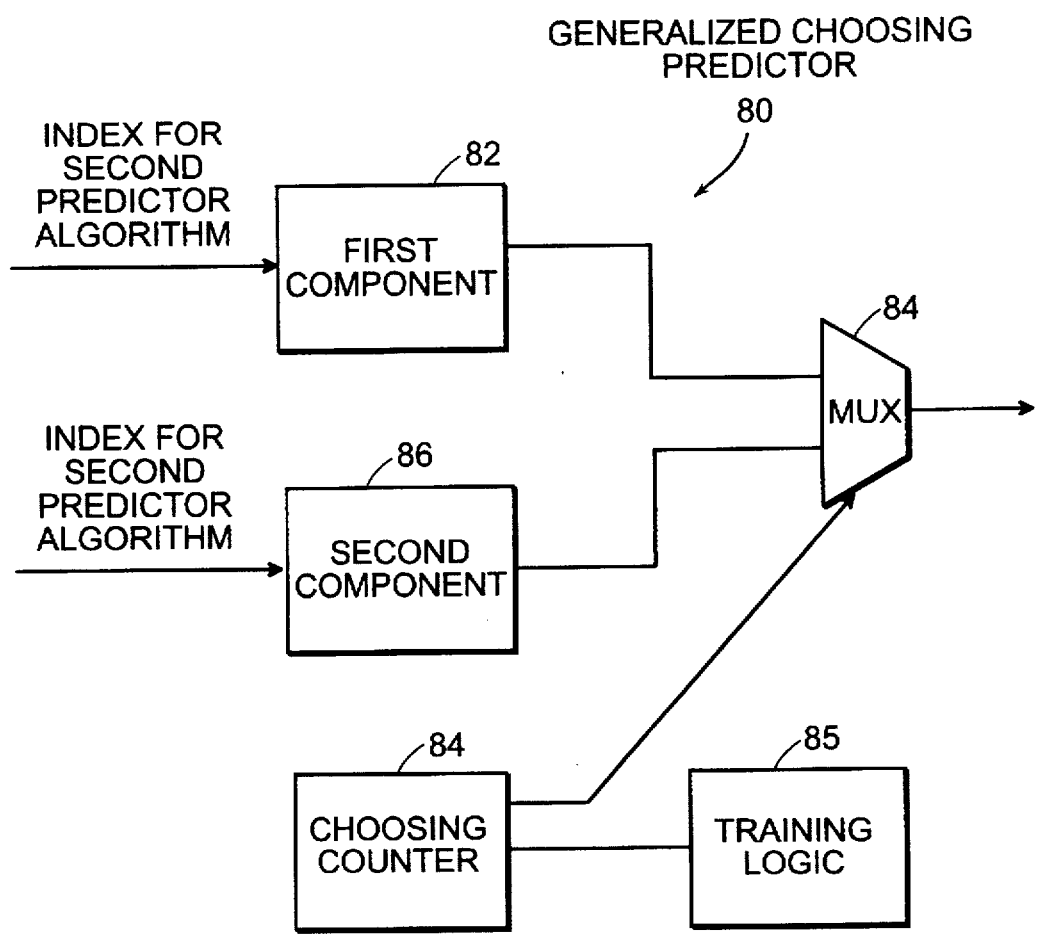
FIG. 8 is a block diagram of a generalized choosing predictor in accordance with a still further aspect of the present invention.

Referring now to FIG. 8, a choosing predictor 80 is shown to include first and second predictors 82, 86 each operating using different algorithms preferably one of such algorithms being a local and one being a global algorithm. The choosing predictor 80 further includes a choosing counter file 84 corresponding in size to each prediction file in each of the first and second predictors 82,86. The counter file 84 is trained using an algorithm which is dependant upon which predictor was selected and whether the prediction was resolved correct or not. By providing a choosing counter, substantially different prediction mechanism can be used to predict an outcome of a process. Since each of the different prediction mechanisms can be optimized for different conditions, the choosing predictor can provide improved accuracy.

Figure 9:
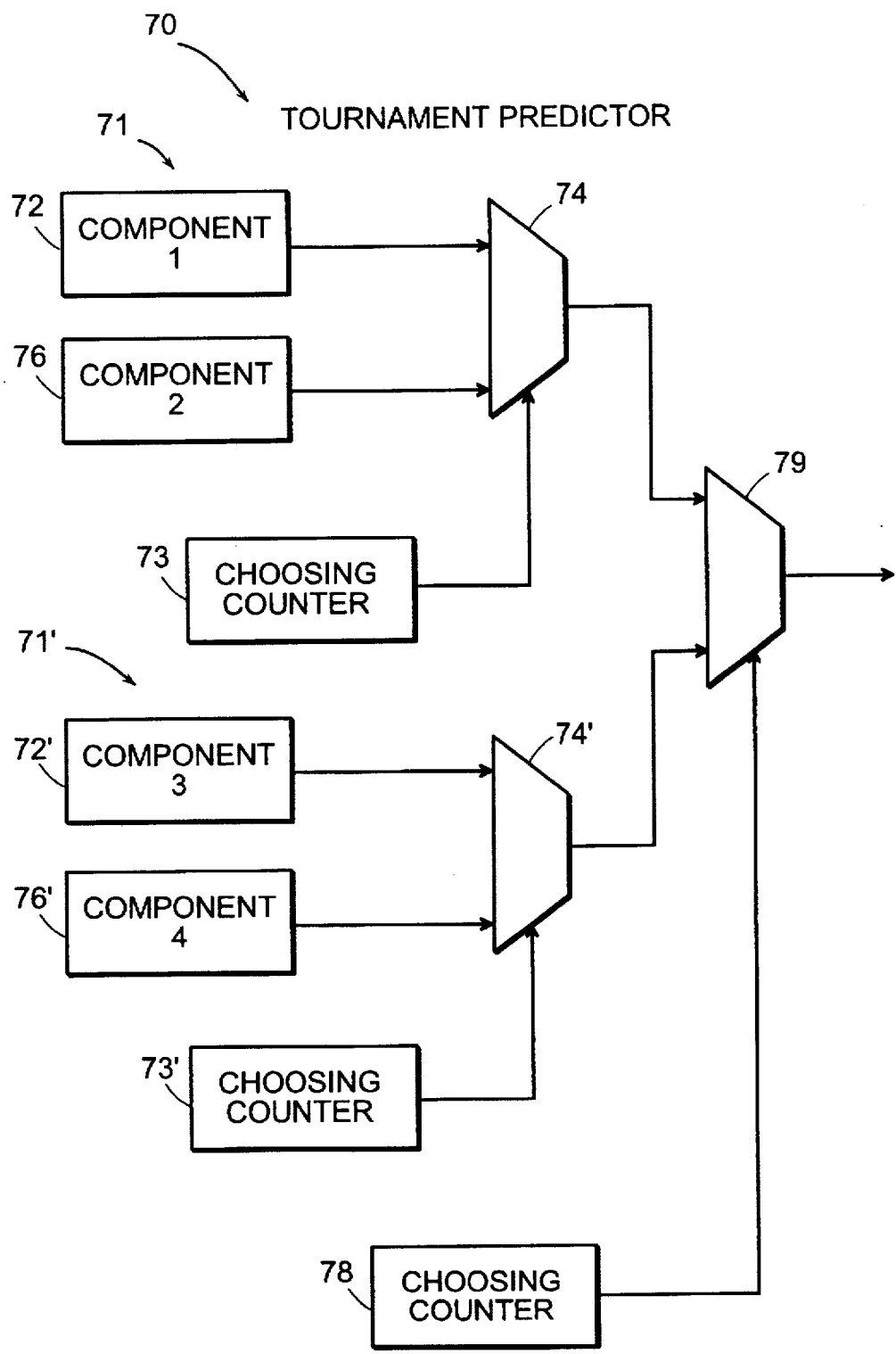
FIG. 9 is a block diagram of a tournament predictor in accordance with a further aspect of the present invention.

In a further embodiment, a choosing predictor 70 could also be comprised of another or two choosing predictors, as shown in FIG. 9. That is, component predictors 72, 76, mux 74 and choosing counter 73 could be a first choosing predictor 71, component predictors 72', 76', mux 74' and choosing counter 73' could be a second choosing predictor 71' where the component predictors 72, 76, and 72', 76' could be predictors which operate using different prediction algorithms. The tournament choosing predictor 70 would have a choosing counter 78 to choose between the two choosing predictors 71, 71'. Each of the choosing counters 73, 73' would chose their predictions from their respective component predictors and the counter 78 would conduct a tournament between the choosing predictors 71, 71' to choose the best prediction for the action. Each choosing counter would have training logic (not shown) to train their respective counters.

In a further embodiment, the choosing predictor rather than supplying a bit indicating a prediction of a process, could be used to provide an address of a next sequence of instructions. That is the counters could be replaced by or could supplemented with registers which are loaded with potential prefetch addresses.

Having described preferred embodiments of the invention it will now become apparent to one of ordinary skill in the art that other embodiments incorporating their concepts can be used. Accordingly it is felt that the invention should not be limited to the disclosed embodiments but rather should be limited only by the spirit and scope of the appended claims.

What is claimed is:

1. A predictor for generating a prediction of an instruction outcome from prior instruction outcomes, comprising:
   a first component predictor which operates on said prior instruction outcomes according to a first algorithm to produce a prediction of said instruction outcome;
   a second component predictor which operates on said prior instruction outcomes according to a second algorithm to produce a prediction of said instruction outcome; and
   means, coupled to each of said first and second component predictors, for choosing between predictions provided from said component predictors to provide a prediction of said instruction outcome from said predictor.

2. The predictor of claim 1 wherein said means for choosing comprises:
   means for training said means for choosing, said means for training being responsive to predictions from each of said component predictors and to a signal indicating an actual outcome of the instruction for which an instruction outcome prediction was generated by said predictor.

3. The predictor of claim 2 wherein said means for choosing is a bank of counters responsive to the predicted instruction outcome.

4. The predictor of claim 3 wherein said means for choosing has a number of counters corresponding to a size of the first and second component predictors.

5. The predictor of claim 4 wherein said means for choosing is indexed by an index which addresses the first component predictor.

6. The predictor of claim 4 wherein said means for choosing is indexed by an index which addresses the second component predictor.

7. The predictor of claim 1 wherein said first component predictor is a local predictor and said second predictor is a global predictor.

8. The predictor of claim 7 wherein said first component predictor is responsive to an address of said instruction whose outcome is currently being predicted.

9. The predictor of claim 8 wherein said first component predictor produces a prediction based upon a history of outcomes of said instruction at the address.

10. The predictor of claim 1 wherein said second component predictor is a global path predictor and said means for choosing is indexed via a global path history of said global path predictor.

11. The predictor of claim 1 wherein said second component predictor is a global path predictor and said means for choosing is indexed via a global path history of said global path predictor and by bits of a program counter.

12. The predictor of claim 1 wherein said second component predictor is a global path predictor and said means for choosing is indexed via a global path history of said global path predictor and by bits of a program counter with said bits being exclusive-or'ed with said global path history.

13. A choosing branch predictor, comprising:
   a first component branch predictor which operates according to a past history branch algorithm to produce a prediction of whether an instruction will or will not take a branch;
   a second component branch predictor which operates according to a global path history algorithm to produce a prediction of whether said instruction will or will not take a branch; and
   means, coupled to each of said first and second component predictors, for choosing between predictions provided from said first and second component predictors to provide a prediction of the branch from the choosing branch predictor.

14. The predictor of claim 13 wherein said means for choosing comprises:
   means for training said means for choosing, said means for training being responsive to predictions from each of said first and second component predictors and to a signal indicating an actual outcome of the instruction for which an instruction outcome prediction was generated by the predictor.

15. The predictor of claim 14 wherein said means for choosing is a bank of counters responsive to a resolution of the predicted action.

16. The predictor of claim 15 wherein said means for choosing has a number of counters corresponding to a size of the first and second component predictors.

17. The predictor of claim 16 wherein said means for choosing is indexed by an index which addresses the first component predictor.

18. The predictor of claim 15 wherein said means for choosing is indexed by an index which addresses the second component predictor.

19. The predictor of claim 15 wherein said first component predictor is responsive to an address of an instruction whose action is currently being predicted.

20. A tournament predictor, comprising:
   a first choosing predictor, comprising:
      a first component predictor which operates according to a first algorithm to produce a prediction of an action;
      a second component predictor which operates according to a second algorithm to produce a prediction of said action; and
      means, coupled to each of said first and second predictors, for choosing between predictions provided from said predictors to provide a prediction of the action from the first choosing predictor;
   a second choosing predictor, comprising:
      a third component predictor which operates according to a third algorithm to produce a prediction of an action;
      a fourth component predictor which operates according to a fourth algorithm to produce a prediction of said action; and
      means, coupled to each of said third and fourth predictors, for choosing between predictions provided from said predictors to provide a prediction of the action from the second choosing predictor; and
   means, coupled to each of said first and second choosing predictors, for choosing between predictions provided from said choosing predictors to provide a prediction of the action from said tournament choosing predictor.

21. Trainable apparatus for predicting an outcome of an instruction in a pipelined processor, said apparatus comprising:
   a first component predictor which is responsive to a previous outcome of said instruction for producing a prediction of said instruction outcome;
   a second component predictor which is responsive to a previous outcome of an instruction other than said instruction for producing a prediction of said instruction outcome; and
   training means, coupled to each of said first and second component predictors and responsive to a plurality of previous instruction outcomes for choosing between predictions provided from said component predictors to provide a predicted outcome from said apparatus.

22. The apparatus of claim 21 wherein said first component predictor is responsive to a plurality of previous outcomes of said instruction for producing a prediction of said instruction outcome.

23. The apparatus of claim 21 wherein said second component predictor is responsive to a plurality of previous outcomes of said other instruction for producing a prediction of said instruction outcome.

24. The apparatus of claim 21 wherein said instruction is part of a prefetched instruction sequence.

25. A pipelined computer processor having a branch predictor for predicting whether a conditional branch will be taken as a result of a conditional branch instruction, said branch predictor comprising:

a first component predictor which operates according to a first algorithm to produce a first prediction of whether said conditional branch will taken;

a second component predictor which operates according to a second algorithm to produce a second prediction of whether said conditional branch will be taken; and means, coupled to each of said first and second component predictors, for choosing one of said first and second predictions.

26. The pipelined computer processor of claim 25, further comprising:

means, responsive to the chosen one of said first and second predictions, for loading an instruction execution pipeline in said pipelined computer processor with instructions.

27. The pipelined computer processor of claim 25, wherein said first algorithm generates said first prediction based in part on whether said conditional branch had been taken in the past.

28. The pipelined computer processor of claim 25, wherein said second algorithm generates said second prediction based in part on whether at least one other conditional branch preceding said conditional branch was taken.

29. The pipelined computer processor of claim 25, wherein said choosing means is responsive to a prediction accuracy of said first component predictor and to a prediction accuracy of said second component predictor for choosing one of said first and second predictions.

30. Trainable apparatus for predicting an outcome of an instruction in an instruction stream in a pipelined processor, said apparatus comprising:

a first component predictor which is responsive to a location in said instruction stream of said instruction for producing a prediction of said instruction outcome;

a second component predictor which is responsive to a location in said instruction stream of an instruction other than said instruction for producing a prediction of said instruction outcome; and training means, coupled to each of said first and second component predictors and responsive to a plurality of previous instruction outcomes for choosing between predictions provided from said component predictors to provide a predicted outcome from said apparatus.

31. Trainable apparatus for predicting an outcome of an instruction in an instruction stream in a pipelined processor, said apparatus comprising:

a first component predictor which is responsive to an outcome of said instruction for producing a prediction of said instruction outcome;

a second component predictor which is responsive to a location in said instruction stream of an instruction other than said instruction for producing a prediction of said instruction outcome; and training means, coupled to each of said first and second component predictors and responsive to a plurality of previous instruction outcomes for choosing between predictions provided from said component predictors to provide a predicted outcome from said apparatus.

* * * * *